(12) United States Patent
Huberman et al.

(10) Patent No.: US 8,781,977 B1
(45) Date of Patent: Jul. 15, 2014

(54) SYSTEM AND METHOD OF PRICING RESOURCES

(75) Inventors: Bernardo Huberman, Palo Alto, CA (US); Scott Clearwater, Woodside, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1874 days.

(21) Appl. No.: 11/092,247

(22) Filed: Mar. 29, 2005

(51) Int. Cl.
*G06F 17/00* (2006.01)
*G06G 7/00* (2006.01)

(52) U.S. Cl.
USPC .......................................................... 705/400

(58) Field of Classification Search
USPC .......................................................... 705/400
See application file for complete search history.

(56) References Cited

U.S. PATENT DOCUMENTS

| | | |
|---|---|---|
| 3,911,517 A | 10/1975 | Davis |
| 4,591,980 A | 5/1986 | Huberman et al. |
| 4,835,680 A | 5/1989 | Hogg et al. |
| 4,835,732 A | 5/1989 | Huberman et al. |
| 5,394,324 A | 2/1995 | Clearwater |
| 5,526,477 A | 6/1996 | McConnell et al. |
| 5,530,520 A | 6/1996 | Clearwater |
| 5,808,920 A | 9/1998 | Zwan et al. |
| 5,826,244 A | 10/1998 | Huberman |
| 5,966,280 A | 10/1999 | Cerminara et al. |
| 5,991,270 A | 11/1999 | Zwan et al. |
| 6,027,112 A | 2/2000 | Guenther et al. |
| 6,078,906 A | 6/2000 | Huberman |
| 6,085,216 A | 7/2000 | Huberman et al. |
| 6,098,028 A | 8/2000 | Zwan et al. |
| 6,115,718 A | 9/2000 | Huberman et al. |
| 6,119,052 A | 9/2000 | Guenther et al. |
| 6,272,507 B1 | 8/2001 | Pirolli et al. |
| 6,400,372 B1 | 6/2002 | Gossweiler et al. |
| 6,415,368 B1 | 7/2002 | Glance et al. |
| 6,441,817 B1 | 8/2002 | Gossweiler et al. |
| 6,470,269 B1 | 10/2002 | Adar et al. |
| 6,631,451 B2 | 10/2003 | Glance et al. |
| 6,834,811 B1 | 12/2004 | Huberman et al. |
| 2002/0073009 A1 | 6/2002 | Hogg et al. |
| 2002/0147895 A1 | 10/2002 | Glance et al. |
| 2003/0055677 A1* | 3/2003 | Brown et al. ...................... 705/1 |
| 2003/0074166 A1 | 4/2003 | Jackson et al. |
| 2003/0233323 A1* | 12/2003 | Bilski et al. ..................... 705/40 |
| 2004/0215529 A1* | 10/2004 | Foster et al. .................... 705/26 |

OTHER PUBLICATIONS

Valuation of Commodity-Based Swing Options, Patrick Jaillet et al., 2004, pp. 909-921.
Pricing of Electricity Swing Options, Jussi Keppo, 2004, pp. 26-43.
A Discrete Valuation of Swing Options, Lari-Lavassani et al., 2001, pp. 35-73.

* cited by examiner

*Primary Examiner* — John Hayes
*Assistant Examiner* — David J Clark (57) ABSTRACT

Embodiments of the present invention relate to a system and method for pricing resources. One embodiment of the present invention includes a historical usage database adapted to store historical customer usage and pricing data, and a pricing algorithm module adapted to perform a simulation using the historical customer usage and pricing data to establish resource usage prices and swing option prices that will maintain a profit margin near or equal to a profit margin setting.

32 Claims, 5 Drawing Sheets

SYSTEM AND METHOD OF PRICING RESOURCES

BACKGROUND OF THE RELATED ART

This section is intended to introduce the reader to various aspects of art, which are related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

In a computing environment, certain resources are often desirable and even necessary to perform specific tasks. For example, computerized tasks and services are becoming more prevalent in today's world. However, such resources are not always readily acquired. Accordingly, organizations without significant information technology (IT) management capabilities and IT resources are often burdened with computerized tasks and services that they are not equipped to handle because they do not have ready access to needed resources. Even organizations with significant computer resources available do not always have the resources necessary to meet peak demands. In many cases, it is not desirable or economically efficient for such companies and organizations to purchase the hardware necessary to meet these demands.

DETAILED DESCRIPTION

One or more exemplary embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which often vary from one implementation to another. Moreover, it should be appreciated that such a development effort can be complex and time consuming, but would be a routine undertaking of design, fabrication, and manufacture for those of ordinary skill having the benefit of this disclosure. Additionally, it should be noted that while examples provided herein relate to computational resources, embodiments of the present invention are applicable to a wide variety of resources (e.g., internet services, electricity, and natural gas).

It is now recognized that challenges associated with performing computerized tasks can be solved by using resource providers that offer computation resource services. Computation resource services include providing various computational resources (e.g., disk storage, CPUs, and network bandwidth) as a service to customers. In one embodiment of the present invention, a resource provider sells the right to use IT assets to customers in blocks of time based on a range of predicted use. The customer can access the purchased resource-time through a number of access means including through a computer network, via a disk transfer, or within a computer memory and processor. In one embodiment of the present invention, a customer can send an email that is read by a resource provider's customer support and then provided to the SOS. In still another embodiment, the customer can call the resource provider's customer support and make an order. In other words, the SOS can handle resource requests through the same means as a stockbroker.

In accordance with embodiments of the present invention, a customer can alleviate strain on its IT resources by purchasing the use of a block of computational resources (e.g., CPUs) for a designated period. This allows the customer to address temporary computational resource shortages without having to actually purchase more hardware. Additionally, the customer can avoid maintenance of a surplus of reserve hardware, which can give the customer a competitive advantage.

In one example in accordance with embodiments of the present invention, where the resources are CPUs, the customer would pay for the CPUs used plus the convenience of not having to own and operate the computational resources (e.g., a data center). An SOS contract is designed to fulfill the needs of the customer for computation convenience and the need of the resource provider for a profit. Because the resources are available on a short term notice the resource provider can charge a premium over the long-term cost of purchasing the resources, yet the customer can still save money in the long run because there is a much lower rate of wasted resources with the resource provider in a SOS contract. It should also be noted that computational demand can be swapped in an out of a resource grid by the resource provider. For example, computation resource allocations in a queue can be manipulated in an automated way to better maintain system throughput within reserves and with a minimum of customer dissatisfaction.

Figure 1:
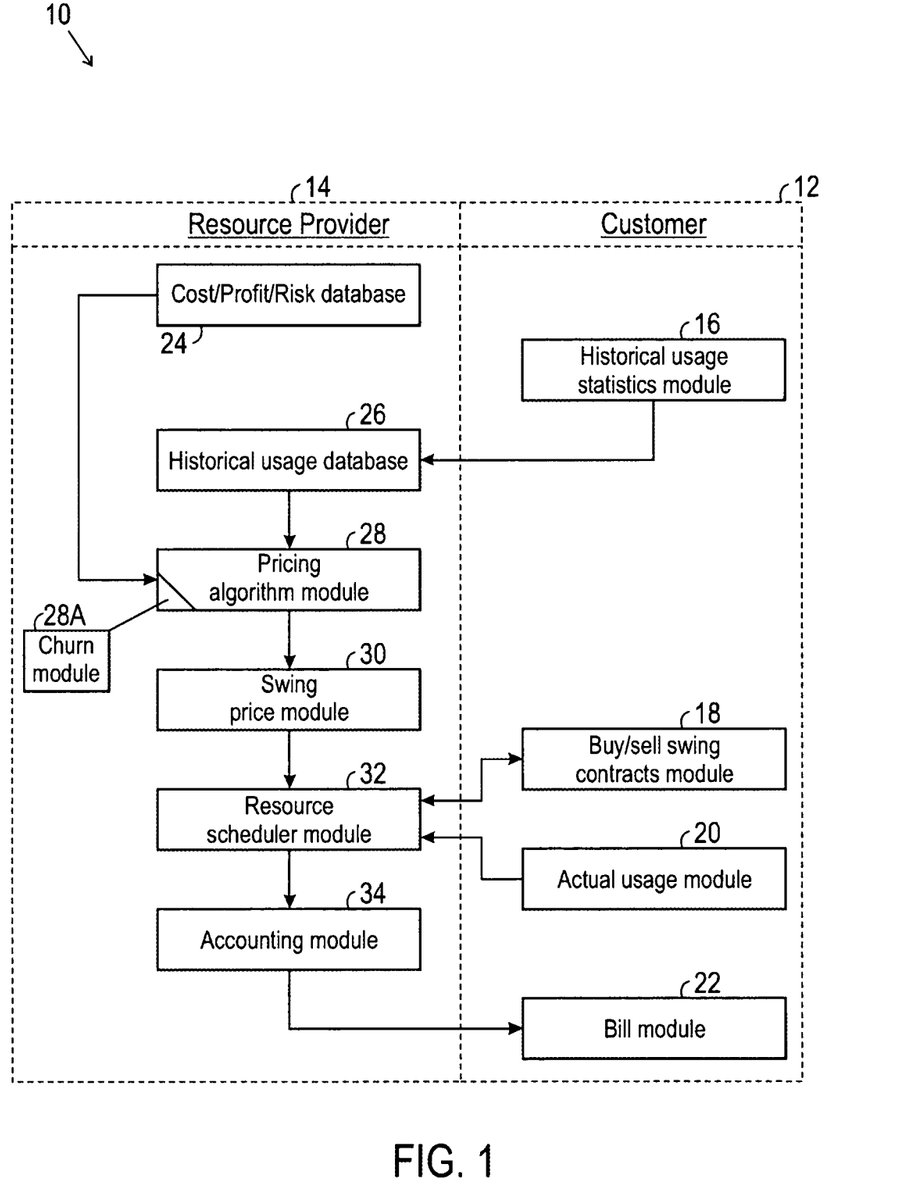
FIG. 1 is a block diagram of a swing option service (SOS) architecture illustrating one embodiment of the present invention.

FIG. 1 is a block diagram of a swing option service (SOS) architecture illustrating one embodiment of the present invention. The architecture is generally referred to by reference number 10. Specifically, FIG. 1 provides an illustration of how the SOS works between a resource provider and a customer. While FIG. 1 separately delineates specific modules of the architecture 10, in other embodiments, individual modules are split into multiple modules or combined into a single module. Additionally, in some embodiments of the present invention, the modules in the illustrated architecture 10 do not operate in the illustrated order. Further, individual modules in the architecture 10 represent hardware, software, or some combination of the two.

The illustrated SOS architecture 10 includes a set of modules that correspond to a customer 12 and a set of modules that correspond to a resource provider 14. These modules cooperate to provide a pricing scheme for resources (e.g., computational resources). Specifically, the modules corresponding to customer 12 include a historical usage statistics module 16, a buy-sell swing contract module 18, an actual usage module 20, and a bill module 22. The modules corresponding to the resource provider 14 include a cost-profit-risk database 24, a historical usage database 26, a pricing algorithm module 28, a swing price module 30, a resource scheduler 32, and an accounting module 34.

Embodiments of the present invention relate to designating and charging customers a price for computation services. While various pricing models can be used in accordance with embodiments of the present invention, the embodiment illustrated by FIG. 1 is a pricing model for an SOS. The SOS operates to charge customers for using various types and amounts of computational resources based on a profit margin set by the resource provider. For example, embodiments of the present invention parameterize costs of providing calculation services and the cost of swing options such that a resource provider can designate the amount of return it desires. The SOS does not require an active market to establish prices. Indeed, embodiments of the present invention utilize records of past resource usage from the historical usage statistics module 16 to allocate and charge for services. The records can be specific to a particular user (i.e., each user has a specific record) or aggregated over a plurality of users (i.e., historical data for all users is combined).

Swing options are used in accordance with embodiments of the present invention to allocate and schedule future usage of resources (e.g., computational resources) in view of desired profitability. Swing options are also referred to as flexible load contracts and variable base-load factor contracts. Swing options include a reservation of a right to use a resource or set of resources at a particular time in the future. It should be noted that swing options merely represent a right of use and do not require that the resource actually be utilized. Additionally, customers purchase swing options to acquire or reserve the right to use a certain range of resources. Indeed, swing options span a lower and upper range of customer usage. The lower range is the least amount of resources the customer expects to use and the upper range is the maximum amount. For example, a customer can designate that it will need between 100 and 500 CPUs to accomplish a task that will be addressed at some time in the future.

Embodiments of the present invention regulate pricing of computation services based on swing options, which provides a fluctuation based pricing model and moves away from a pure pay-for-use model. For example, a resource provider in accordance with embodiments of the present invention can derive most of its profits from swing contracts, swing range violation penalties, or options reselling (i.e., churning). As discussed above, swing options have an upper range and a lower range. In one embodiment of the present invention, the customer pays no less than what is required by the lower swing range (e.g., 100 CPUs in the example above) and a penalty for utilization in excess of the upper swing range (e.g., over 500 CPUs in the example above). Paying no less than what is required by the lower swing range and a penalty for exceeding the upper swing range creates an incentive for the customer to correctly predict usage.

Predictable usage benefits resource providers because it facilitates resource planning in advance of customer use. This is often cheaper and more efficient than providing resources on a short-term basis. Predictable usage also benefits customers because they are assured that resources will be available when needed. For example, the SOS allows users to maintain a potentially large standby reserve to satisfy bursts in resource demand. Indeed, SOS allows users to manage peak demands in a cost effective manner without actually requiring the purchase of an inventory of resources. This provides a price advantage to users in a competitive environment. Further, customers are not burdened with maintenance of such resources when they are not needed.

Embodiments of the present invention relate to a pricing model that parameterizes what services should cost the customer based on a desired profit margin for the resource provider. To account for changing usage patterns, an SOS in accordance with embodiments of the present invention can change prices to maintain a predictable and consistent profit margin. This includes determining swing option prices and usage fees in accordance with some embodiments of the present invention. For example, the SOS architecture 10 is adapted to change resource usage prices to maintain a predictable profit margin as set by the resource provider 14 in the cost-profit-risk database 24. Specifically, the pricing algorithm 28 performs a cross-validation simulation study using historical data from the historical usage database 26 and data from the cost-profit-risk database 24 to set an appropriate price for services. The historical usage database 26 includes the resource provider's database of previous customers' usage and charges.

Once service prices are determined, the prices are published and the resource scheduler 32 offers a calendar of available resources. The customer 12 can utilize the resource scheduler 32 to determine availability and then purchase swing options through the buy-sell swing contracts module 18. Indeed, the buy-sell contracting module 18 facilitates payment by the customer 12 of various types of fluctuation-based fees. Further, it should be noted that the resource provider 14 can also utilize the buy-sell swing contracts module 18 to purchase swing options from the customer 12 that the customer 12 no longer wishes to own.

One aspect of fluctuation-based profits comes from customers 12 selling swing options back to the resource provider 14 at a discount to the original purchase price. This benefits the resource provider 14 by facilitating resale of the swing option and associated future usage to another customer 12 (i.e., multiple income streams from the same resource). Additionally, the resale of swing options to the resource provider benefits the customer 12 by reducing the customer's expenses. However, in accordance with embodiments of the present invention, selling swings back to the resource provider actually increases the risk to the customer by narrowing the window for valid usage and increasing the potential for being penalized. Accordingly, if a customer sells swings back to the resource provider, it typically has determined that the chance of being penalized is small enough to justify accepting a partial rebate in exchange. Because losses for the customer 12 are not completely eliminated, embodiments of the present invention that allow the customer to sell swings back to the resource provider still provide incentive for the customer 12 to give accurate usage estimates.

In addition to swing options and fluctuation-based fees, the customer 12 pays for actual usage of resources (e.g., computation services). The actual usage module 20 represents the customer's demand. In one embodiment, the actual usage module 20 represents a demand submission (i.e., a list of jobs or resource requirements) or order that is handled by the resource scheduler module 32. Individual customer usage variation accounts for differences in the contributions to the resource provider's profit from penalties and swing trading. At the end of a billing cycle, the accounting module 34 calculates charges based on purchased swing options and customer usage, and sends the customer 12 a bill. The customer has access though the bill module 22 (e.g., a web interface) to cumulative charges as well as estimated charges for the current billing period or a future billing period.

General features of a swing option pricing strategy include a swing strike price. The swing strike price ("strike") is the price at which the swing option is offered by the resource provider. The strike is a function of current_time, start, end, $Resource_{min}$, and $Resource_{max}$, where current_time represents a current time value, start represents a beginning time value, end represents a completion time value, $Resource_{min}$ (e.g., $CPU_{min}$) represents a lower end of a range of predicted resource usage, and $Resource_{max}$ (e.g., $CPU_{max}$) represents an upper end of a range of predicted resource usage. The time values relate to a length of commitment. It should be noted that while the above example and those that follow are given for CPUs, embodiments of the present invention are also directed to other resources including computational resources such as disk storage and network bandwidth. Further, computational resources also include bundles of computational resources called "computons."

The strike has various qualitative behavior characteristics that provide different customer incentives in accordance with embodiments of the present invention. For example, in one embodiment, the strike is an increasing function of (start-current_time), which incentivizes early commitment by the customer. In one embodiment, the strike is a decreasing function of (end-start), which incentivizes longer commitment by the customer. In one embodiment, the strike is a decreasing function of ($Resource_{max}$), which incentivizes larger commitment by the customer. In one embodiment, the strike is an increasing function of ($Resource_{max}$–$Resource_{min}$), which encourages assured commitment. Additionally, the strike has a value in excess of any resale value allowed in accordance with embodiments of the present invention. For example, in one embodiment a price of resell is equal to (r×strike) where r is a value less than one. The resell is from the customer back to the resource provider. The resource provider can then sell the same resource to another customer for what could be a higher price than the original customer's price depending on the qualitative behavior. As discussed above, this benefits both the resource provider and customer while creating an incentive for the customer to provide accurate swing range values.

Another feature of a swing option pricing strategy in accordance with embodiments of the present invention includes a penalty function. The penalty term relates to over usage. The penalty function ("penalty") is a function of $Resource_{min}$ (e.g., $CPU_{min}$), $Resource_{max}$ (e.g., $CPU_{max}$), and $Resource_{actual}$ (e.g., $CPU_{actual}$), where $Resource_{min}$ is an actual value for the amount of the designated resource used by a customer. The penalty operates to penalize corresponding to a function determined by the resource provider (e.g., proportional to the time and amount of overage if $Resource_{actual}$ is greater than $Resource_{max}$). In some embodiments, penalization is quadratic or exponential to the time and amount of overage if $Resource_{actual}$ is greater than $Resource_{max}$. Additionally, if $Resource_{actual}$ is less than $Resource_{min}$, the user is still invoiced for $Resource_{min}$. In a case where usage falls below the lowest swing option range (i.e., under usage), the customer is obligated to pay the lower bound of the swing option in place. For example, in a case where the average usage of a customer fell below the lowest swing option at all times, the customer is still obligated to pay out at the value of the lowest swing option at each time interval for the contract.

In one embodiment of the present invention, $n_{peak}$ is is the peak number of resources needed and $n_{avg}$ is the average number of resources expected to be used by a customer. A load factor in accordance with embodiments of the present invention is defined as follows:

$$\text{load factor} = f = n_{avg}/n_{peak}. \quad \text{(Equation 1)}$$

Where the historical usage is found to be completely constant, f=1 and there is no profit because the customer could have bought the resources itself rather than utilize the SOS. However, this will rarely be the case over the long term. Accordingly, in accordance with embodiments of the present invention, the resource provider provides for peak usage of a particular customer through resource sharing with other customers. Assuming that the peak usages are not fully correlated, the resource provider provides a fraction of the summed peak usages of all its customers. In fact, the ability to effectively share resources through uncorrelated usage is one of the competitive advantages of a bank of resources (e.g., a data center) over direct ownership by a consumer.

In one embodiment of the present invention, SOS revenue includes four components as set forth below:

$$\text{revenue} = \text{average usage} + \text{swing options} + \text{penalties} + \text{churn}. \quad \text{(Equation 2)}$$

The swing options take care of the profits and relate to putting a floor on expected profit margins. The penalties and churn balance out service violations as well as providing extra sources of profit. The penalties are assessed by the resource providers to a customer for going above a defined swing range. The churn is money related to the customer making subsequent swing trades. For example, churn relates to a situation where a customer expects a different level of use than that covered by its original swings and it buys or sells new swing contracts to make the swing contract range more financially efficient. In the case where the customer sells back a swing to the resource provider, these resources can be resold by the resource provider to another customer thereby allowing the resource provider to receive revenue multiple times on the rights to the same resources. In some embodiments of the present invention, the pricing algorithm module 28 includes a churn module 28A that accounts for changes due to resale of swing options to maintain a profit margin at a defined level.

The profit margin of the SOS is linked to the swing usage (i.e., number of swing contracts purchased by customers) in accordance with embodiments of the present invention. Without considering the penalties and churn, the overall revenue to the resource provider can be written in terms of the peak and average usage and the swing costs as set forth below:

$$\text{revenue} = \text{cost} + \text{profit} = cn_{peak}(1+m) = cn_{avg} + \text{swing}, \quad \text{(Equation 3)}$$

where c is the cost per unit of computation resource to the resource provider for providing the service and m is the desired fractional profit margin to the resource provider. This equation allows the resource provider to determine the price to charge customers for swing contracts that achieve a desired profit margin. This is represented by the following equation:

$$\text{swing} = cn_{peak}((1-f)+m). \quad \text{(Equation 4)}$$

What remains to be determined is the cost of each swing option to the customer. In one embodiment of the present invention, historical data relating to a particular customer provides predictive power and the customer exercises the minimum number of swing options that it needs to cover its usage. In other words, the user does not have swings that are too high or too low relative to its needs. Typically, there will be a granularity in the swing CPU ranges so that there will be some excess capacity that the user is paying for but not using. This works in the favor of the resource provider since these could in principal be shared with another user.

In one embodiment of the present invention, the range of resources covered by a swing is represented by $\Delta_{swing}$. For example, where the resources are CPUs, the following is representative:

$$\Delta_{swing} = \text{range of CPUs covered by a swing.} \quad \text{(Equation 5)}$$

The range of resources covered by the swing contract is represented by:

$$\text{Resource}_{range} = \text{Resource}_{max} - \text{Resource}_{min}. \quad \text{(Equation 6)}$$

The number of swing contracts, s, exercised by a user during a time period (e.g., one day or one week) is given by:

$$s = \langle \text{Resource}_{range} \rangle / \Delta_{swing}, \quad \text{(Equation 7)}$$

where the average is over the user or facility profile usage data. Profile usage data includes historical data relating to a particular user or aggregate group of users. For example, in one embodiment of the present invention, profile usage data includes the range of resources used on a particular day by a specific customer. The cost of exercising a swing contract is represented by e=strike. The cost of the swing is set such that it corresponds to the pre-defined level of profit of the swing option in swing=$cn_{peak}((1-f)+m)$. This is represented as follows:

$$\text{swing} = se = cn_{peak}((1-f)+m), \quad \text{(Equation 8)}$$

or, alternatively, solving for e, $$e = cn_{peak}((1-f)+m)/s = cn_{peak}((1-f)+m)\Delta_{swing}/\langle\text{Resource}_{range}\rangle. \quad \text{(Equation 9)}$$

Equations 8 and 9 are utilized in the swing price module 30 in accordance with embodiments of the present invention. Adding in the penalty and churn profits provides the following representation:

$$\text{profit} = \text{swing} + c\beta\Delta_{Resource} + \text{churn}, \quad \text{(Equation 10)}$$

where $\beta(>1)$ is a penalty scale function and $\Delta_{Resource}$ is a cumulative amount (e.g., in cycles such as CPU-hr) that the contract deviates from the bounds of the swing contract divided by T, the total time of the contract.

Buying and selling additional swing contracts by users (i.e., churn) is accounted for in accordance with embodiments of the present invention. Indeed, in accordance with one embodiment, the churn includes one of four actions: a swing cancellation on the high side (a lower upper bound), a swing cancellation on the low side (a higher lower bound), a new swing on the high side (a higher upper bound), or a new swing on the low side (a lower lower bound). The change in profit to the resource provider, assuming a time dependency in the canceling and refund rate and no change in actual usage, can be represented as follows:

$$\text{churn} = \text{Presale}(dt) \times \text{strike}(dt) - \text{Pcancel}(dt) \times r(dt) \times \text{strike}(dt), \quad \text{(Equation 11)}$$

where churn is a change in revenue to the resource provider because of a change in swing contracts, dt is equal to a difference between an exercise date and a cancellation date, Pcancel is a probability of a swing being cancelled on the high side or low side, Presale is a probability that a swing will be resold after it has been cancelled, and r is a refund rate as a fraction of the original swing cost for a cancelled swing. Pcancel and Presale are determined from historical data. The value of r is set by the resource provider to tune the churn profit to be a desired value (e.g., to cancel out service violations).

Once the SOS has been in operation for a certain amount of time, there will be historical data relating to cancellations and resales. This allows the resource provider to decide what the refund schedule should be to preserve the proper level of profit margin. Because r<1, the resource provider comes out ahead financially on swing churning. However, it is still advantageous to the user to cancel when the user has decided it does not need downside protection. This is true because the user effectively recoups a refund (e.g., some fraction of the original swing cost). Also, canceling a swing contract on the high side reduces costs to the customer and recoups some of the cost of the swing. However, swing trading is not always advantageous to the user. In certain situations, swing trading leads to higher minimum costs because of usage below a higher swingLo (lower bound of a swing range) or due to more penalties from usage above a lower swingHi (upper bound of a swing range).

In one embodiment of the present invention, higher usage by customers is encouraged by the resource provider by offering a "low fluctuation" discount so that the proportional usage term is modified to be:

$$\text{average usage} = c(1+\delta(1-f)), \quad \text{(Equation 12)}$$

where $\delta>1$ is the discount for higher load factor (i.e., $f \to 1$). There can also be a term to reward users for committing early to a contract, for example:

$$1 - b(1 - e^{-\Gamma \Delta \tau}), \quad \text{(Equation 13)}$$

where $b>0$ is the maximum discount for an early commitment, $\Gamma>0$ is the early discount decay rate, and $\Delta\tau$ is the time between when the swing was purchased and when it is exercised (i.e., used).

If the actual usage follows the historical data, the resource provider will receive the amount of profit defined by profit=swing+$c\beta\Delta_{Resource}$+churn. If the usage data has fewer fluctuations than during an actual contract, the swing profit will be the same. If the fluctuations are higher than the historical data then the penalty term defined by profit=swing +$c\beta\Delta_{Resource}$+churn will become functional while the resource provider retains the same profit from exercised swing options.

The swing price is defined to fit the usage profile and to achieve an average level of profit to the resource provider. Accordingly, in accordance with embodiments of the present invention, the gross profit margin is given by the following equation, which is utilized in the pricing algorithm module 28:

$$m_{gross} = (se + \beta\Delta_{Resource}c + e(\text{Presale} - r\text{Pcancel}))/(cn_{peak}) - 1 + f. \quad \text{(Equation 14)}$$

To avoid penalties, a conservative user will exercise more swing options. This will increase the profit to the resource provider from the swings. Thus, the user will either overestimate the number of swings and incur an extra swing cost or underestimate the number of swings needed and incur extra penalties. Either way, the resource provider benefits because of the existence and unpredictability of the fluctuations.

Figure 2:
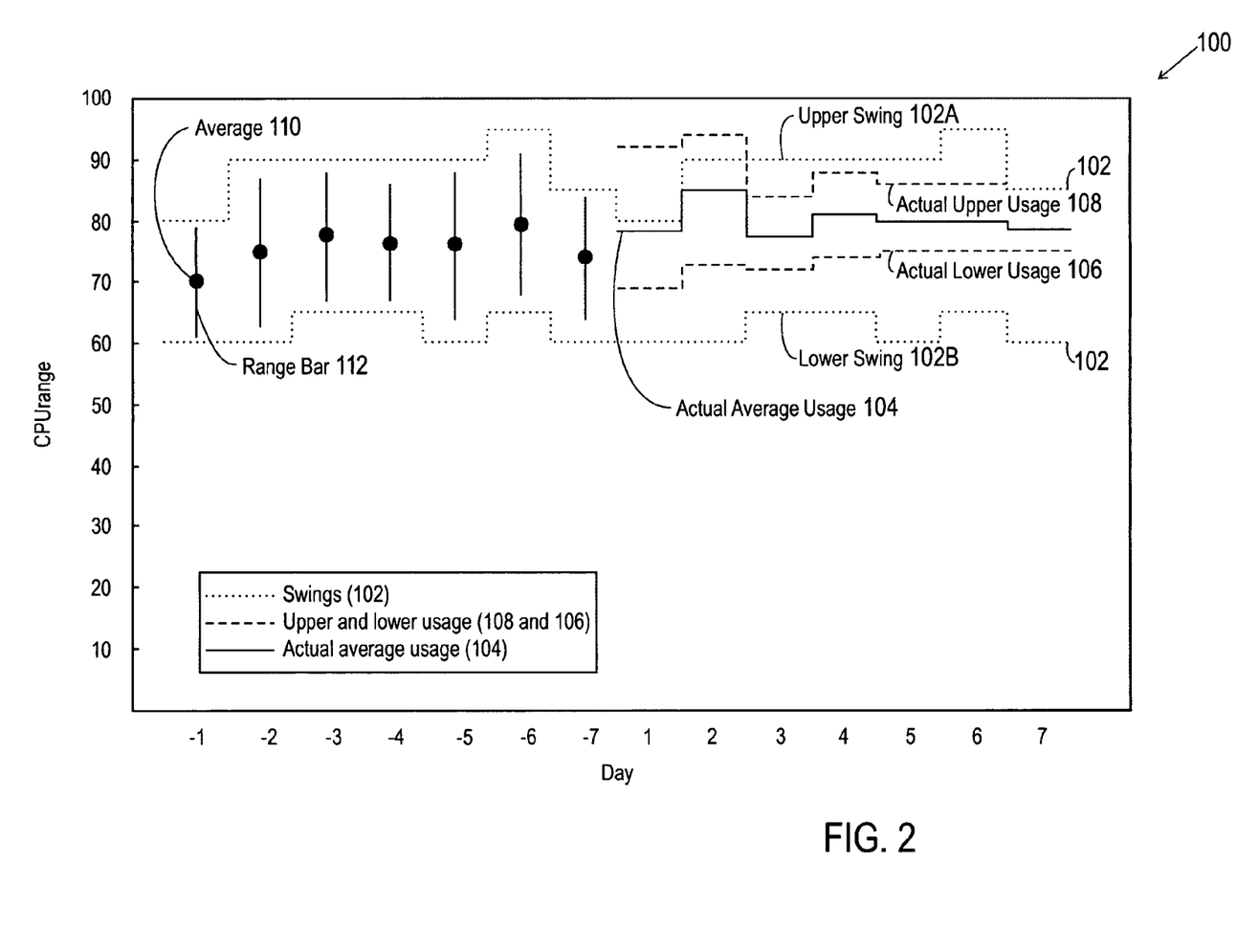
FIG. 2 is a graph of exemplary historical profile data along with an exemplary actual usage trace illustrating one embodiment of the present invention.

FIG. 2 is a graph of exemplary historical profile data along with an exemplary actual usage trace illustrating one embodiment of the present invention. The graph in FIG. 2 is generally referred to by reference number 100. Graph 100 is adapted from actual server trace usage data. Specifically, graph 100 includes swings 102 (i.e., upper swing 102A and lower swing 102B), actual average usage 104, actual lower usage 106, and actual upper usage 108. The swings 102 are illustrated by the area designated by dotted lines. The upper swing 102A is the uppermost dotted line and the lower swing 102B is the lowermost dotted line. The dashed lines correspond to upper and lower usage (e.g., actual lower usage 106 and actual upper usage 108). The solid line corresponds to actual average usage 104.

The negative times (e.g., day −1) correspond to profiled data used to determine swing ranges. Points 110 and range bars 112, as illustrated relative to the negative times, correspond to a profile (e.g., historical data). In the illustrated embodiment, each point 110 represents an average usage for a past period. However, it should be noted that in other embodiments, each data point represents an absolute maximum, a median, or a percentile from the historical data. Each range bar 112 represents average peaks and minimums or a total range of historical data. For example, the upper portion of each range bar in the illustrated embodiment is representative of the average peak use of a resource in the past and the lower portion is the average minimum use in the past.

Current usage takes place for positive times corresponding to the negative times. For example, profile day "−1" is a profile for current day "1," and so forth. Profit taken from the positive or current days (e.g., day 1) is made from the actual average usage 104, the swings 102, and overage penalties associated with the actual upper usage 108 that extends outside of the swings 102 (e.g., solid lines that go above the dotted line bounding the swings 102). In other words, users pay for actual average usage 104, protection relating to the swings 102 (e.g., guarantee of availability), and penalties (e.g., actual upper usage 108 outside of the swing range). For example, in the illustrated embodiment, on day 2 the user will be required to pay for actual average usage of approximately 85 CPU and an overage penalty for an actual upper usage 108 of approximately 5 CPU in excess of the upper swing 102A. It should be noted that in the illustrated embodiment, overage penalties only apply when usage exceeds the upper swing 102A, while underage is not penalized but merely assigned the value of the lower swing 102B.

Table 1 below includes SOS model parameters and values illustrating one embodiment of the present invention. Specifically, table 1 includes assumptions relating to inputs and parameters of an SOS model simulated based on hypothetical historical data and relating to CPU usage as a resource. For example, table 1 is representative of a portion of the cost-profit-risk database 24 in accordance with an embodiment of the present invention relating to a data center. It should be noted that the values in table 1 are exemplary values associated with illustrating one embodiment of the present invention. In other embodiments, different values apply for the parameters in table 1.

TABLE 1

| Parameter | Determined by | Value |
|---|---|---|
| $n_{avg}$ | historical usage | 80 |
| $n_{peak}$ | historical usage | 96 |
| $<CPU>_{range}$ | historical usage | 25 |
| $\beta$ | SOS | 2 |
| $\Delta_{swing}$ | SOS | 5 |
| r | SOS | 0.5 |
| m | SOS | 0.1 |
| s | calculated | 5 |
| e | calculated | 6 |
| f | calculated | 0.8 |
| Pcancel | real-time | 0.10 |
| Presale | real-time | 0.10 |
| $\Delta$CPU | real-time | 5 |
| $m_{gross}$ | real-time | 0.2 |
| $m_{net}$ | real-time | 0.1 |

Certain assumptions are made for illustrative purposes. For example, in the SOS model corresponding to table 1, it is assumed that c=1 without loss of generality. In other words, c is a scaling factor and setting c=1 simplifies the equation for the model without affecting the form of the equation. Additionally, it is assumed that no time-varying quantities were present and that the probability of canceling and repurchasing a swingLo or swingHi was uniformly random over time at a rate of 10% per day. A Normally distributed class (Gaussian distribution) of service violation with average $m_{gross}/10$ and standard deviation of $m_{gross}/20$ is also assumed. Thus, the following equation is representative:

$$m_{net} = m_{gross} - \text{service.violation} = m_{gross} - N(0.1m_{gross}, 0.05m_{gross}),$$ (Equation 15)

where $m_{net}$ is net profit to the SOS, service.violation is an amount of violations by the resource provider, and $N(0.1m_{gross}, 0.05m_{gross})$ is the Gaussian distribution of the average and standard deviation with an average of $0.1m_{gross}$ and standard deviation of $0.05m_{gross}$. This equation is utilized in the pricing algorithm 28 in accordance with embodiments of the present invention.

Figure 3:
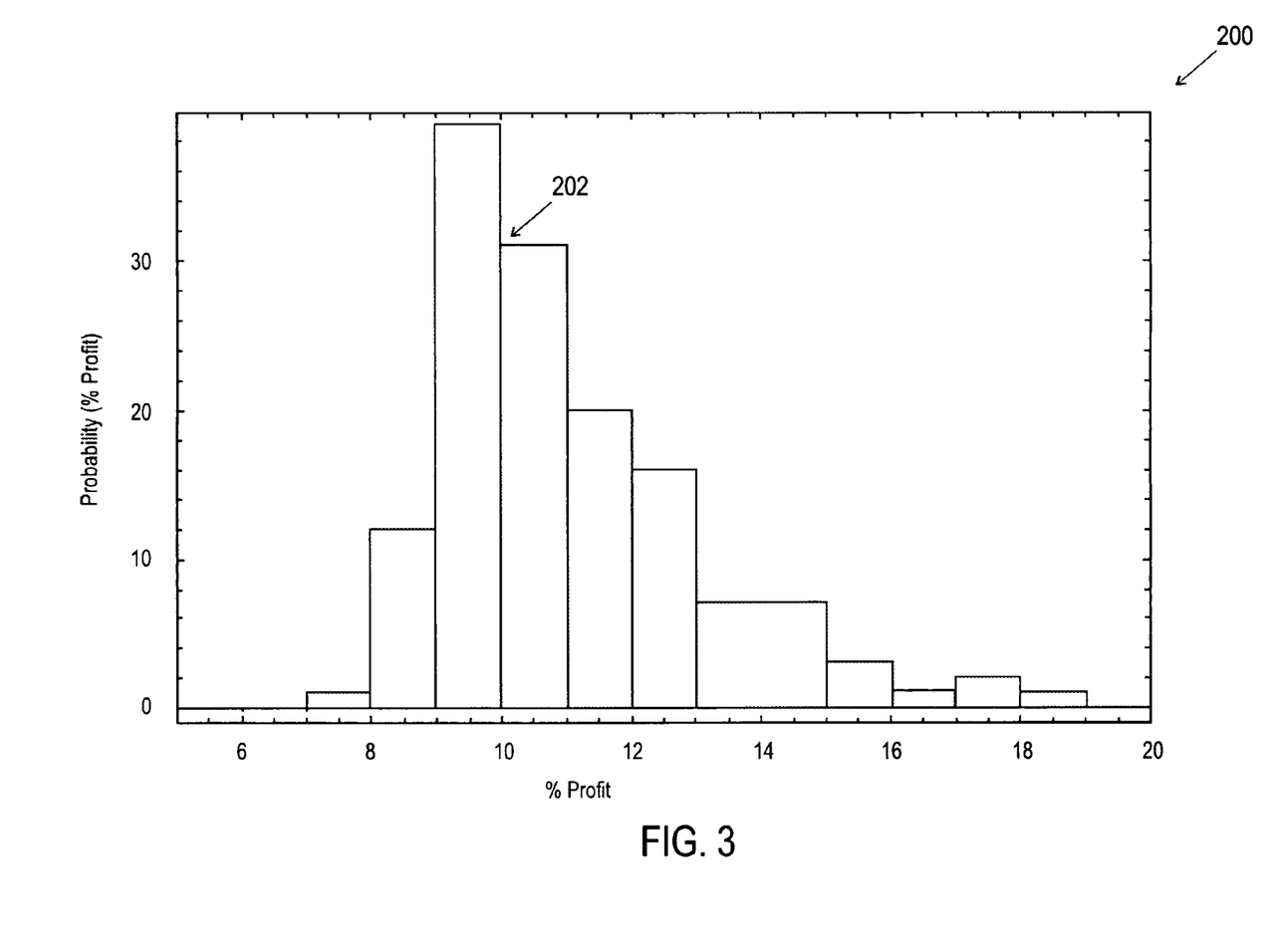
FIG. 3 is a graph of simulated daily profit margin distribution illustrating one embodiment of the present invention.

FIG. 3 is a graph of simulated daily profit margin distribution illustrating one embodiment of the present invention. The graph in FIG. 3 is generally referred to by reference number 200. Specifically, graph 200 is a graph of probability (% profit) on the Y-axis versus percent profit on the X-axis. Graph 200 includes a profit margin distribution based on hypothetical past usage of a customer from a historical log of forty-nine days. The profile data from which the swing prices were calculated consisted of 21 days and the test data against which the prices were calculated consisted of 14 days. Seven day segments were essentially randomly chosen from the log of forty-nine days to constitute the profile and test data, and to preserve the day-to-day correlations.

The desired profit in the SOS is set by the resource provider. In the illustrated example, the SOS profit is set at 10%. The desired SOS profit is exceeded when there are swing contract violations. The values for swingLo and swingHi are set to span the historical profile. Thus the swings are chosen in accordance with embodiments of the present invention to minimally cover the profile data. For example, in one embodiment, if the historical profile of a customer indicates that between 100 and 300 CPU will be used by a particular customer, the swing range is defined as 100 to 300. As illustrated by graph 200, profit is most likely to be 10% as expected. This is clear because the highest probability (% profit) occurs around 10% as indicated by arrow 202. However, there is a probability for less than 10% profit if the actual usage is less than the historical average usage or certain classes of service violations (e.g., failure to supply the reserved resources) occur.

Figure 4:
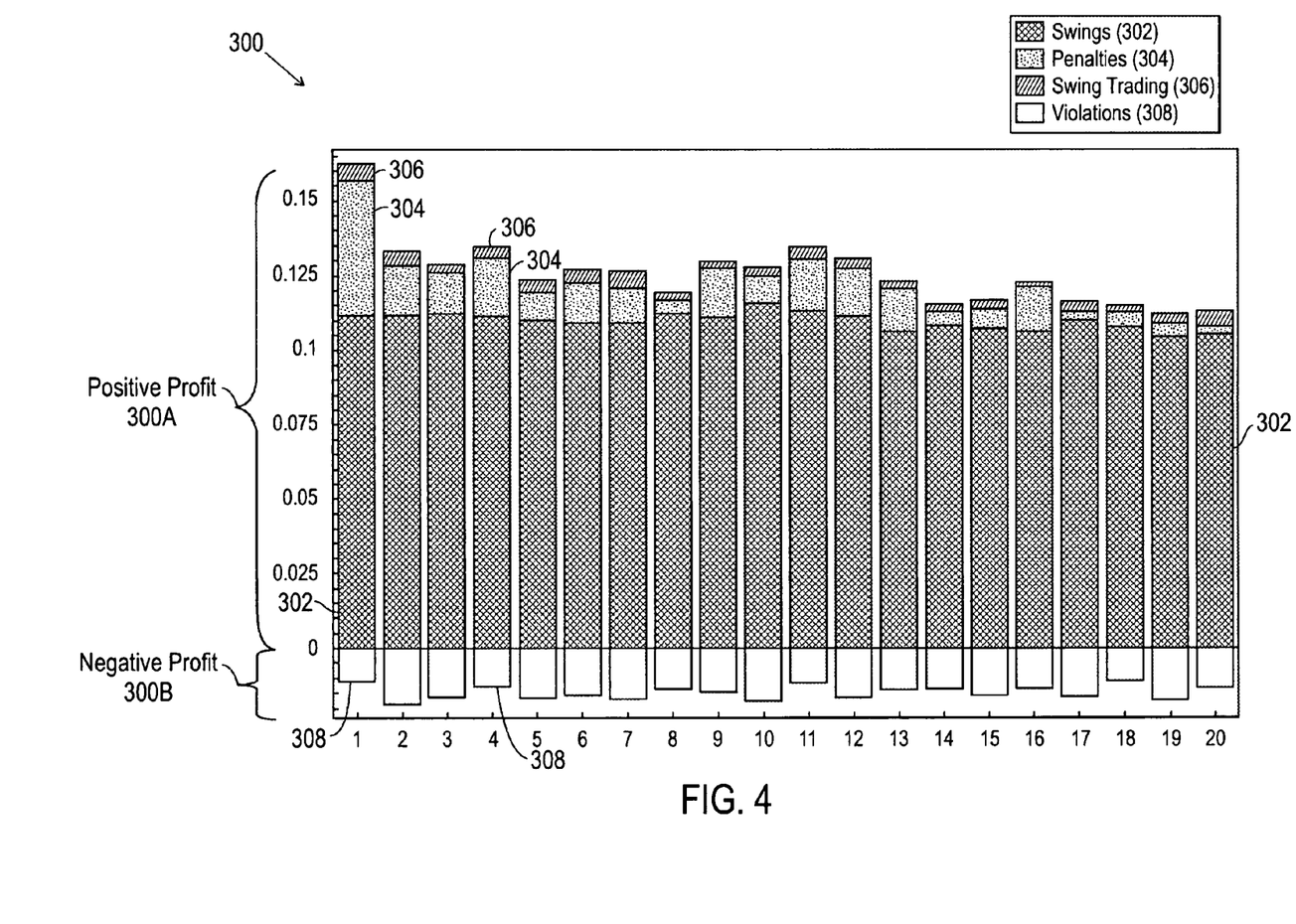
FIG. 4 is a bar graph of the breakdown of profit contributions as a function of time when swing trading is taken into account illustrating one embodiment of the present invention.

FIG. 4 is a bar graph of the breakdown of profit contributions as a function of time when swing trading is taken into account illustrating one embodiment of the present invention. The bar graph in FIG. 4 is generally referred to by reference number 300. Specifically, graph 300 is a graph of fractional profit margin distribution on the Y-axis and associated weeks on the X-axis. The portions of the bars extending above the fractional profit margin distribution value of zero are positive profit contributions 300A and those below zero are negative profit contributions 300B (e.g., reductions to profit due to service violations). The sum of the positive and negative profit contributions is the total profit contribution. For example, the total profit contribution for week 1 is approximately 0.015 fractional profit (0.16−0.01=0.15).

The fractional profit margin distribution by week for swings, penalties, swing trading, and service violations are distinguished by graphical textures in graph 300. The fractional profit margin distribution for swings by week are represented as cross-hashed bars 302 due to actual usage and swings. The fractional profit margin distribution for penalties are represented as dotted bars 304. The fractional profit margin distribution for swing trading (i.e., chrun as opposed to swing ranges) are represented as striped bars 306. The fractional profit margin distribution for service violations are represented as white bars 308.

The original swings relating to graph 300 were selected at the minimum range which covers the profiled usage. An example of selecting the minimum range includes selecting a swing range of exactly 20-80 CPUs for a particular week when the historical profile for that week indicates that the maximum usage was 80 CPU and the minimum usage was 20 CPU. The swing trading is modeled by a 10% probability that swingHi or swingLo will be raised or lowered for that time period by 1 swing contract. This effectively adds random noise to the swing ranges such that its effect on the profit margin can be simulated.

As can be determined from graph 300, the average swing profit over the 20 weeks is 10.9%, which is close to the desired 10%. The average penalty profit is 1.3%, the average churn profit is 0.4%, and the average service violations are 1.5%. Total profit (total=swing+penalty+churn−service violations) of $m_{net}$=11.1%, which is merely 1.1% away from the desired figure of in $m_{gross}$=10%. In some embodiments with different parameter settings, a different distribution of profit results. However, the combination of profit from actual usage and swings is generally close to the figure selected by the resource provider in accordance with embodiments of the present invention. Profits above the desired level are often due to excessive penalties or swing trading, or a combination of both.

Figure 5:
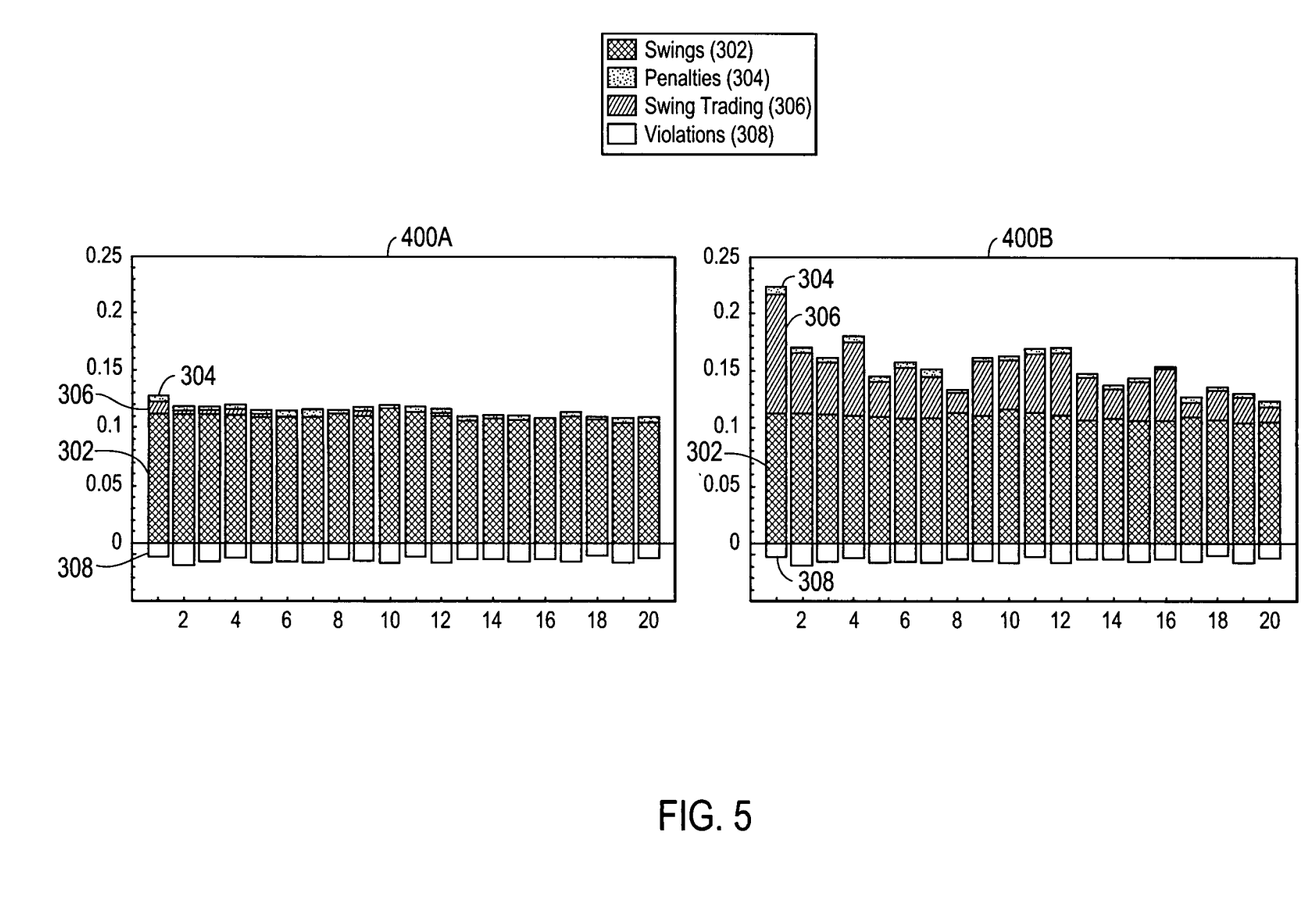
FIG. 5 includes a pair of bar graphs and provides a comparison of fractional profit margin distribution as a function of time for different swing strategies illustrating one embodiment of the present invention.

FIG. 5 includes a pair of bar graphs and provides a comparison of fractional profit margin distribution as a function of time for different swing strategies illustrating one embodiment of the present invention. The left graph represents a model of the effects of a conservative swing strategy and is generally referred to by reference number 400A. Specifically, graph 400A represents results of a model wherein there is one extra swing above and below the limits of the minimum range based on profile data. In contrast, the graph on the right represents an aggressive swing strategy and is generally referred to by reference number 400B. Specifically, graph 400A represents results of a model wherein there is one less swing than the limits of the minimum range based on profile data. Both graphs 400A and 400B are graphs of fractional profit margin distribution on the Y-axis and associated weeks on the X-axis.

As can be determined from graphs 400A and 400B, the conservative swing strategy led to a profit margin of $m_{net}$=10% for the resource provider and the aggressive swing strategy led to a profit margin of $m_{net}$=13% for the resource provider. This indicates that an aggressive swing strategy (graph 400B) hurts the customer on average because of excessive penalty charges. In contrast, the more conservative swing strategy (graph 400A) lowered the profit margin of the resource provider from 11.1% in the scenario illustrated by graph 300 to 10%, which means that the customer saved 1.1%. The resource provider benefits from both customer strategies. The resource provider benefits from the aggressive strategy by acquiring additional profits. Further, the resource provider benefits from the conservative strategy because the predictable usage facilitates accommodation of unexpected peaks, which the resource provider can sell at a premium.

In a system where all historical data is aggregated (i.e., swing costs and other calculated quantities are based on the overall customer portfolio), it should be noted that certain users or customers with high swing costs, penalties, or churn often will not remain with a particular resource provider. This is because these users or customers will be disproportionately carrying the resource provider's profit burden. Additionally, assuming a competitive market of resource providers exists, users or customers with predictable usage will have lower costs and such users will migrate to the resource provider with the most advantageous pricing. This will eventually lead to lower profit margins. However, in accordance with embodiments of the present invention, the resource provider institutes a customer admission policy that effectively selects a portfolio of customers that includes a certain percentage of higher profit customers, assuming such customers are available.

Alternatively, in a system wherein the resource provider prices each customer individually rather than in aggregate, the customer can attempt to manipulate the system. For example, a customer can provide an initially noisy set of profile data, which will cause the resource provider to set the cost of individual swings at a relatively low value and attempt to make up for lost profit in volume. However, if the customer is attempting to manipulate the system, it can deliberately choose a small swing range knowing that its actual usage data will be smooth. In such a case, the small swing range will be acceptable by the customer because the customer knows the true usage and it will pay less for the swings. This results in a lower cost overall. However, such customers only have a short period before new historical data precedes and obviates the manipulation. Over time, the advantage of the customer will disappear and the profit margin for the particular customer will revert to the target set by the resource provider. It should be noted that, in accordance with embodiments of the present invention, none of the historical records will be stationary. Accordingly, the SOS will periodically update its prices for swings, penalties, churns, and service violations.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system, comprising:
 a memory storing program code; and
 a processor coupled to the memory, operable to execute the program code, and based at least in part on the execution of the program code operable to perform operations comprising
  performing a simulation based on historical customer usage and pricing data, based on the simulation, determining a resource usage price and a swing option price
   based on a specified target profit margin for an offeror, wherein the resource usage price corresponds to a price offer from the offeror to an offeree that covers actual resource usage by the offeree and the swing option price corresponds to a price offer from the offeror to the offeree that covers reservation of a right of the offeree to future resource usage within a specified range bounded by an upper resource usage amount and a lower resource usage amount, and
  outputting the resource usage price and the swing option price.

2. The system of claim 1, wherein, based at least in part on the execution of the program code, the processor is operable to perform operations comprising offering the swing option to the offeree for purchase at the determined swing option price.

3. The system of claim 1, wherein, based at least in part on the execution of the program code, the processor is operable to perform operations comprising monitoring and storing data relating to actual resource usage, and facilitating payment for the actual resource usage at the determined resource usage price.

4. The system of claim 1, wherein the determining of the swing option is based on a specified commitment time.

5. The system of claim 1, wherein the determining of the swing option price is based on a current time value, a beginning time value, and a completion time value.

6. The system of claim 5, wherein the determining of the swing option price is based on an increasing function of the beginning time less the current time.

7. The system of claim 5, wherein the determining of the swing option price is based on a decreasing function of the completion time less the beginning time.

8. The system of claim 1, wherein the determining of the swing option price is based on a function of a range of predicted resource, usage, the range of predicted resource usage having an upper end and a lower end.

9. The system of claim 8, wherein the determining of the swing option price is based on a decreasing function of the upper end of the range of predicted resource usage.

10. The system of claim 8, wherein the determining of the swing option price is based on an increasing function of the upper end less the lower end of the range of predicted resource usage.

11. The system of claim 1, wherein, based at least in part on the execution of the program code, the processor is operable to perform operations comprising ascertaining a penalty price, the penalty price being a function of a range of predicted resource usage and actual resource usage, and the determining of the swing option price is based on the ascertained penalty price.

12. The system of claim 1, wherein the determining is based on a predicted change in revenue due to resale of swing options.

13. The system of claim 1, wherein, based at least in part on the execution of the program code, the processor is operable to perform operations comprising providing access to the resource.

14. A method, comprising operating a processor to perform operations comprising:
setting a target profit margin for an offeror;
performing a simulation based on historical usage and pricing data; and
based on the simulation, determining, by the processor, a swing option price and a usage price based on the target profit margin, wherein the resource usage price corresponds to a price offer from the offeror to an offeree that covers actual resource usage by the offeree and the swing option price corresponds to a price offer from the offeror to the offeree that covers reservation of a right of the offeree to future resource usage within a specified range bounded by an upper resource usage amount and a lower resource usage amount; and
outputting the resource usage price and the swing option price.

15. The method of claim 14, further comprising offering the swing option to the offeree for purchase at the determined swing option price.

16. The method of claim 14, further comprising monitoring data relating to actual resource usage by the offeree.

17. The method of claim 14, further comprising billing the offeree for the actual resource usage at the established usage prices and for purchased swing options.

18. The method of claim 15, further comprising crediting the offeree for violations by a resource provider.

19. The method of claim 14, wherein performing the simulation comprises determining a predicted range of usage using the historical usage data.

20. The method of claim 19, further comprising determining a penalty charge as a function of the predicted range of usage and the actual resource usage.

21. The method of claim 14, further comprising charging a premium when the offeree requests delivery of resources within a timeframe that is shorter than a predefined time limit.

22. The method of claim 14, further comprising offering a low fluctuation discount, wherein the low fluctuation discount is a function of a load factor.

23. A method, comprising:
on a first network node, providing historical data relating to prior resource usage to a second network node;
on the second network node,
performing a simulation based on historical customer usage and pricing data, based on the simulation,
determining, by a processor, a resource usage price and a swing option price based on a specified target profit margin for an offeror, wherein the resource usage price corresponds to a price offer from the offeror to an offeree that covers actual resource usage and the swing option price corresponds to a price offer from the offeror to the offeree that covers reservation of a right of the offeree to future resource usage within a specified range bounded by an upper resource usage amount and a lower resource usage amount, and
outputting the resource usage price and the swing option price; and
on the first network node, receiving the swing option price and the usage price.

24. The method of claim 23, further comprising on the first network node providing access to data relating to actual resource usage.

25. The method of claim 23, further comprising on the first network node initiating a purchase of the actual resource usage at the usage price.

26. The method of claim 23, further comprising on the first network node initiating a purchase of the swing option at the swing option price.

27. The method of claim 26, further comprising on the first network node initiating a reselling of the swing option to a resource provider for a discount price.

28. A system, comprising:
a memory storing program code; and
a processor coupled to the memory, operable to execute the program code, and based at least in part on the execution of the program code operable to perform operations comprising
performing a simulation based on historical customer usage and pricing data, ascertaining a penalty price as a function of a range of predicted resource usage and actual resource usage,
based on the simulation, determining a resource usage price aid a swing option price based on the ascertained penalty price, a current time value: a beginning time value, a completion time value, and a specified target profit margin for an offeror, wherein the resource usage price corresponds to a price offer from the offeror to an offeree that covers actual resource usage by the offeree and the swing option price corresponds to a price offer from the offeror to the offeree that covers reservation of a right of the offeree to future resource usage within a specified range bounded by an upper resource usage amount and a lower resource usage amount, offering the swing option to the offeree for purchase at the determined swing option price, monitoring and storing data relating to actual resource usage by the offeree, and facilitating payment for the actual resource usage at the determined usage price; and facilitating access to the resources.

29. At least one non-transitory computer-readable medium having computer-readable program code embodied therein, the computer-readable program code adapted to be executed by a computer to implement a method comprising:

performing a simulation based on historical customer usage and pricing data;

based on the simulation, determining a resource usage price and a swing option price based on a specified target profit margin for an offeror, wherein the resource usage price corresponds to a price offer from the offeror to an offeree that covers actual resource usage by the offeree and the swing option price corresponds to a price offer from the offeror to the offeree that covers reservation of a right of the offeree to future resource usage within a specified range bounded by an upper resource usage amount and a lower resource usage amount, and outputting the resource usage price and the swing option price.

30. The at least one non-transitory computer-readable medium of claim 29, wherein the method further comprises offering the swing option to the offeree for purchase at the determined swing option price.

31. The system of claim 1, wherein the historical customer usage data describes historical customer usage of computational resources: the historical pricing data describes historical prices of computational resources, the resource usage price corresponds to a price offer from the offeror to an offeree that covers actual computational resource usage by the offeree and the swing option price corresponds to a price offer from the offeror to the offeree that covers reservation of a right of the offeree to future computational resource usage within a specified range bounded by an upper computational resource usage amount and a lower computational resource usage amount.

32. The method of claim 31, wherein the determining comprises determining the computational resource swing option price based on a discount factor that increases the swing option price as a function of difference between the peak amount of computational resource and the average amount of computational resource.

* * * * *